US012432170B2

United States Patent
MacDonald et al.

(10) Patent No.: US 12,432,170 B2
(45) Date of Patent: Sep. 30, 2025

(54) AGNOSTIC DOMAIN COMMUNICATION VIA A USER INTERFACE OF A COMMUNICATION PLATFORM

(71) Applicant: Salesforce, Inc., San Francisco, CA (US)

(72) Inventors: Andrew MacDonald, San Francisco, CA (US); Ratnadeep Bhattacharjee, Palo Alto, CA (US); Natalie Qabazard, Santa Rosa, CA (US); Ohjoong Kwon, Campbell, CA (US); Nikhil Mohan, Burlingame, CA (US); Sarah Henkens, Mission Bay, CA (US); Jeremy Apthorp Rose, San Francisco, CA (US); Samuel Attard, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 405 days.

(21) Appl. No.: 18/099,028

(22) Filed: Jan. 19, 2023

(65) Prior Publication Data
US 2023/0155975 A1 May 18, 2023

Related U.S. Application Data

(63) Continuation of application No. 17/479,972, filed on Sep. 20, 2021, now Pat. No. 11,563,710.

(51) Int. Cl.
*H04L 51/52* (2022.01)
*G06F 21/31* (2013.01)
(Continued)

(52) U.S. Cl.
CPC ............ *H04L 51/52* (2022.05); *G06F 21/31* (2013.01); *H04L 67/146* (2013.01); *G06F 3/0484* (2013.01)

(58) Field of Classification Search
CPC ....... H04L 67/146; H04L 51/52; G06F 21/31; G06F 3/0484
See application file for complete search history.

(56) References Cited

U.S. PATENT DOCUMENTS 11,676,204 B1 * 6/2023 Fleming ................ G06Q 40/04
705/37
2012/0054640 A1 3/2012 Nancke-Krogh
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Andrea C Leggett
(74) *Attorney, Agent, or Firm* — Lee & Hayes, P.C.

(57) ABSTRACT

Agnostic domain communication via a user interface of a communication platform is described. A user interface associated with the communication platform can be presented via a client, wherein an instance of a first workspace of the communication platform that is associated with a first domain is presented via the user interface. A request to access a second workspace of the communication platform that is associated with a second domain that is different from the first domain can be received. Based at least partly on a determination that the request is associated with an attribute that satisfies a criteria, an instance of the second workspace can be presented via the user interface.

20 Claims, 8 Drawing Sheets

(51) Int. Cl.
*H04L 67/146* (2022.01)
*G06F 3/0484* (2022.01)

(56) References Cited

U.S. PATENT DOCUMENTS

| | | | |
|---|---|---|---|
| 2013/0091589 A1 | 4/2013 | Shiakallis et al. | |
| 2013/0254296 A1 | 9/2013 | Lai et al. | |
| 2017/0180497 A1 | 6/2017 | Comstock et al. | |
| 2018/0287982 A1 | 10/2018 | Draeger et al. | |
| 2018/0336286 A1* | 11/2018 | Shah | G06F 1/163 |
| 2019/0130452 A1* | 5/2019 | Ju | G06Q 30/0269 |
| 2021/0054640 A1 | 2/2021 | Moore | |
| 2023/0259643 A1* | 8/2023 | Szigeti | G06F 21/6218 726/28 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Office Action for U.S. Appl. No. 17/479,972, mailed on Jan. 20, 2022, MacDonald, "Agnostic Domain Communication via a User Interface of a Communication Platform", 21 Pages.

Office Action for U.S. Appl. No. 17/479,972, mailed May 20, 2022, MacDonald, "Agnostic Domain Communication via a User Interface of a Communication Platform", 31 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

AGNOSTIC DOMAIN COMMUNICATION VIA A USER INTERFACE OF A COMMUNICATION PLATFORM

RELATED APPLICATIONS

This application claims priority to and is a continuation of U.S. patent application Ser. No. 17/479,972, filed on Sep. 20, 2021, the entire contents of which are incorporated herein by reference.

TECHNICAL FIELD

A communication platform can leverage a network-based computing system to enable users to exchange data. In an example, users of the communication platform can communicate with other users via channels. A channel, or other virtual space, can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a channel can be presented via a user interface. In some examples, the user interface can present a data feed indicating messages posted to and/or actions taken with respect to a particular channel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The figures are not drawn to scale.

DETAILED DESCRIPTION

Figure 1A:
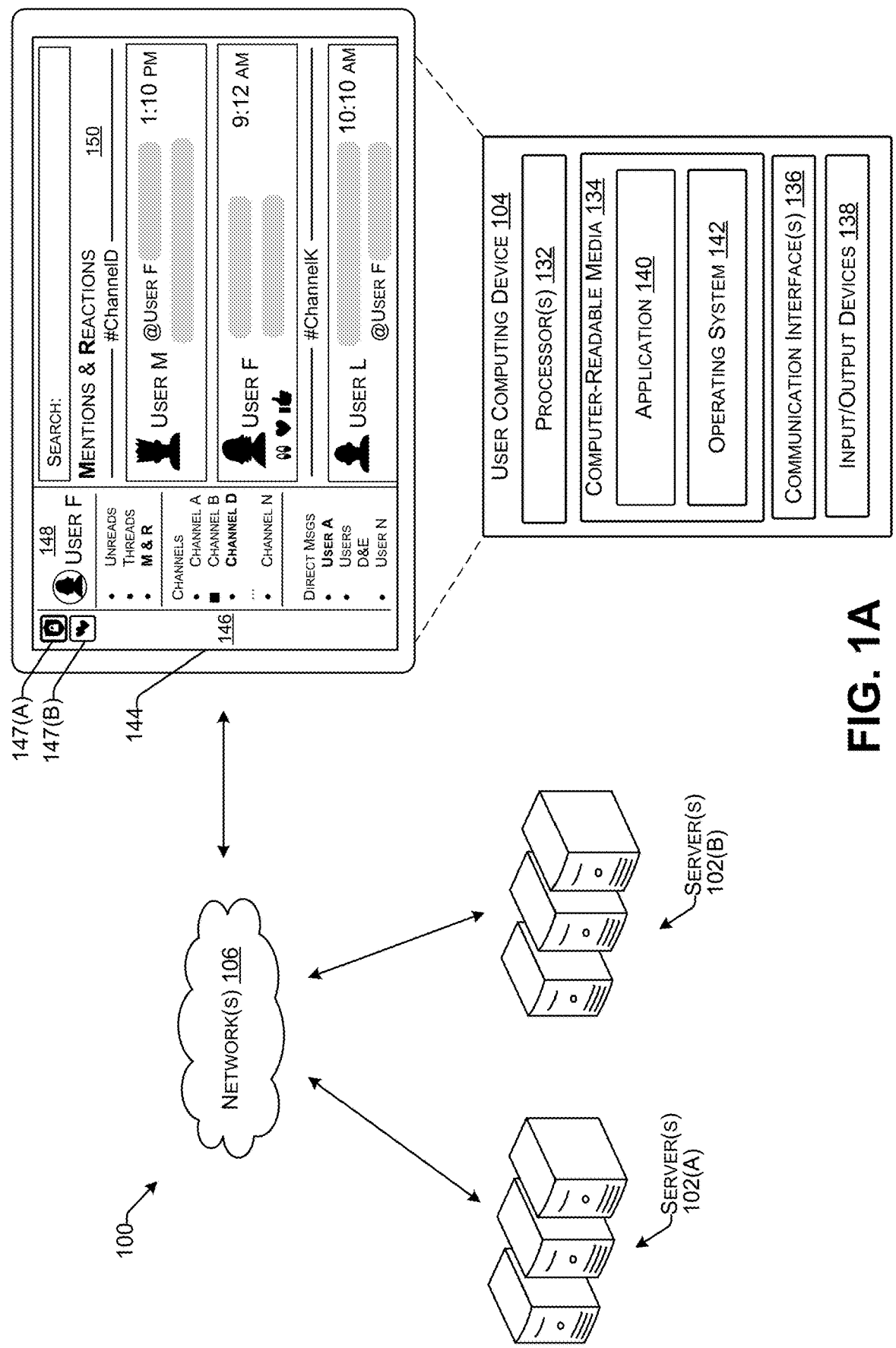
FIG. 1A illustrates an example environment for performing techniques described herein.

Agnostic domain communication in a communication platform is described. In an example, a user can utilize communication services available via a communication platform, which, in some examples can be a group-based communication platform, a channel-based messaging platform and/or any other platform for facilitating communication between and among users. In at least one example, the communication platform can be associated with multiple workspaces, which can be associated with the same or different domains. A workspace can be a hub where users (e.g., team members, group members, department members, employees, etc.) associated with a same group identifier (e.g., entity name, department, division, office, domain, etc.) can communicate and work together. That is, a workspace can be a container that stores and/or manages data associated with a group. In at least one example, the workspace can have a particular set of channels, direct messages, user profiles, files, reactions (e.g., emojis, reactjis, etc.), permissions, data, etc. that are accessible and/or applicable to the group of users associated with the workspace.

In some examples, a communication platform associated with a single domain can be associated with two or more workspaces. In such examples, functional components and data can be stored and/or managed by one or more servers associated with the single domain and access to each of the two or more workspaces can be based on permissions or other mechanisms that are tied to group identifiers, which enforce the "group-based" aspect of the communication platform. In some examples, two or more workspaces can be associated with two or more domains. That is, in some examples, a domain can be particular to a workspace or a workspace can be particular to a domain. In such examples, functional components and data associated with each workspace can be stored and/or managed by one or more servers that are associated with different domains. For example, a first workspace can be associated with www.platform.com and a second workspace can be associated with www.platform.gov or www.platform.edu. In some examples, a particular domain may be associated with enhanced security or permissions (i.e., more restrictive than other domains) such that the communication platform is accessible by a physically separate set of one or more servers than another domain. This physical partitioning of workspaces creates a technical problem relating to user experience when workspaces are associated with multiple domains. Conventionally, each of the workspaces are unaware of one another. That is, conventionally, the physically separate sets of one or more servers operate independently without any interoperability between the two workspaces and/or domains. Techniques described herein provide a technical solution by comingling or otherwise integrating two or more domains to enable functional components of a first workspace/first domain to be able to make cross-domain requests to a second workspace/second domain. That is, techniques described herein enable a user to interact with multiple workspaces, which are associated with multiple domains, from within a same client.

In at least one example, techniques described herein are directed to enabling users associated with multiple workspaces to access data associated with the multiple workspaces and/or otherwise communicate with users associated with the multiple workspaces via a user interface without regard to whether individual of the multiple workspaces are associated with different domains. In at least one example, a single user interface can present data associated with a first workspace associated with a first domain and a second workspace associated with a second domain even though the first domain and the second domain are different domains. For example, techniques described herein are directed to configuring workspaces associated with different domains to be interoperable such that a user can access each of the workspaces via a single user interface without regard to the different domains. That is, techniques described herein enable the comingling or other integration of two or more domains to enable functional components of a first workspace/first domain to be able to make cross-domain requests to a second workspace/second domain. As such, techniques described herein can offer streamlined, more user-friendly interoperability across and/or between workspaces and associated user interfaces than that which is available via conventional technologies.

As an example, consider a user who works for Company A. Company A uses the communication platform and therefore has a workspace associated with Company A on the communication platform. Other users of Company A can collaborate via the workspace based at least in part on being associated with a same group identifier that corresponds to Company A. Company A can use a "commercial" version of the communication platform which is associated with a first domain. However, Company A can offer contracting services for other companies and, as such, the user may be a contractor for Company B. Company B can be subject to compliance or regulations that require Company B operate with more restrictive permissions and/or security than other companies, such as Company A. For example, Company B can be a government agency that is subject to increased data security regulations, a healthcare company that is subject to increased data security regulations, a company in a jurisdiction that has increased data security regulations, and/or the like. In such examples, Company B can use a "restrictive" version of the communication platform which is associated with a second domain that is different than the first domain. In some examples, the first domain can be associated with a first set of one or more servers and the second domain can be associated with a second set of one or more servers, wherein the first and second set of servers are physically separated. The second set of servers can be configured with different, more restrictive permissions and/or security.

In conventional technologies, the user signs into the workspace for Company A by providing their credentials via a user interface associated with the domain with which the workspace is associated. Such credentials can be used to authenticate the user and enable the user to access the workspace for Company A via the user interface. As described above, the user interface for the workspace for Company A is presented via the first domain. That is, the user can access channels, direct messages, data, files, user profiles, etc. associated with the workspace for Company A via the user interface presented in association with the first domain. In conventional technologies, the user accesses the workspace for Company B via another user interface with which the second domain is associated. Accessing different domains via different user interfaces is inconvenient and provides a disruptive user experience for users of the communication platform. Techniques described herein enable the user to access the different workspaces via a single user interface of the communication platform, without regard to the fact that the workspaces are associated with different domains. That is, the user can access the workspace for Company A and the workspace for Company B via the single user interface, even though Company A and Company B are associated with different workspaces that are associated with different domains. Thus, the user can access each workspace via the user interface of the communication platform without regard to the domain from which the workspace is accessed.

As such, techniques described herein provide an improved user experience for the user, compared to those available via conventional technologies.

Additional details are described below with reference to FIGS. 1A-6. It should be noted that, while techniques described herein are described in the context of two or more workspaces associated with a communication platform (e.g., for accessing services associated therewith), techniques described herein can be applicable to any scenario wherein two or more services, offered by different domains that are associated with separate backend configurations, are comingled and/or otherwise integrated at the client. That is, techniques described herein can be implemented to enable comingling or other integration of various services via a single user interface presented by a client.

FIG. 1A illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers). In some examples, a group can be associated with two or more workspaces. In some examples, a workspace can be associated with two or more groups. In some examples, workspaces can be associated with different domains. In some examples, the domains can be physically separated, as illustrated in FIG. 1A. In some examples, workspaces can be logically separated (i.e., associated with a same set of server(s) but separated logically, for example using sharding or other data separation techniques).

In at least one example, the example environment 100 can include one or more server computing devices (or "server(s)") 102. In at least one example, the server(s) 102 can include one or more servers or other types of computing devices that can be embodied in any number of ways. In the example of a server, the functional components and data can be implemented on a single server, a cluster of servers, a server farm or data center, a cloud-hosted computing service, a cloud-hosted storage service, and so forth, although other computer architectures can additionally or alternatively be used. As illustrated in FIG. 1A, the example environment 100 can include one or more sets of one or more servers. For instance, in FIG. 1A, two sets of server(s), server(s) 102(A) and server(s) 102(B), are illustrated. In at least one example, the server(s) 102(A) can be associated with a first domain and the server(s) 102(B) can be associated with a second domain that is different than the first domain. In some examples, the first domain and the second domain can be associated with different permissions and/or restrictions. For example, the first domain can be more restrictive than the second domain when it comes to security and/or permissions, or vice versa. That is, in some examples, the first domain and/or the second domain can be subject to strict data security regulations such that security and/or permissions enabling access to associated data is subject to compliance thereof. As described below with reference to FIG. 1B, in some examples, the server(s) 102(A) and the server(s) 102(B) can be configured the same or differently.

In at least one example, same "types" of workspaces (i.e., workspaces sharing a particular attribute (e.g., a permission, security requirement, compliance requirement, etc.)) can be associated a first set of server(s), such as the server(s) 102(A), and other "types" of workspaces (i.e., workspaces sharing a different, particular attribute (e.g., a permission, security requirement, compliance requirement, etc.)) can be associated with a second set of server(s), such as the server(s) 102(B). As such, a user can be associated with one or more workspaces hosted by the server(s) 102(A) and one or more workspaces hosted by the server(s) 102(B), in which case the a client of the user can access the server(s) 102(A) and the server(s) 102(B) to enable the user to access each of the workspaces. While two sets of servers, representative of two domains, are shown, any number of sets of servers and/or domains can be included in the environment 100.

In at least one example, the server(s) 102 (e.g., server(s) 102(A) and/or 102(B)) can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

Figure 1B:
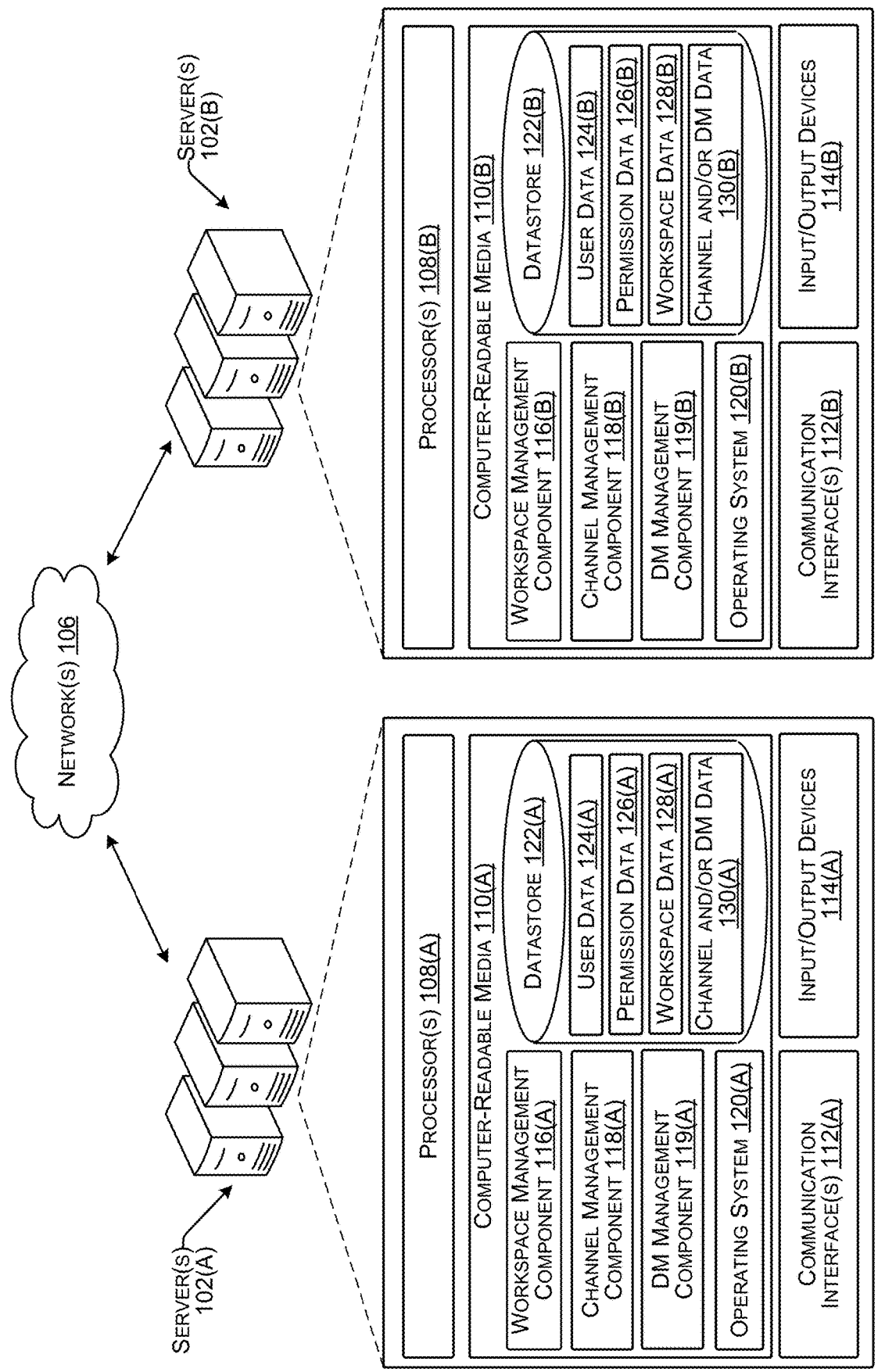
FIG. 1B illustrates additional details associated with the example environment of FIG. 1A, as described herein.

Turning to FIG. 1B, in at least one example, the server(s) 102(A) can include one or more processors 108(A), computer-readable media 110(A), one or more communication interfaces 112(A), and input/output devices 114(A).

In at least one example, each processor of the processor(s) 108(A) can be a single processing unit or multiple processing units, and can include single or multiple computing units or multiple processing cores. The processor(s) 108(A) can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108(A) can be one or more hardware processors and/or logic circuits of any suitable type specifically programmed or configured to execute the algorithms and processes described herein. The processor(s) 108(A) can be configured to fetch and execute computer-readable instructions stored in the computer-readable media, which can program the processor(s) to perform the functions described herein.

The computer-readable media 110(A) can include volatile and nonvolatile memory and/or removable and non-removable media implemented in any type of technology for storage of data, such as computer-readable instructions, data structures, program modules, or other data. Such computer-readable media 110(A) can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110(A) can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110(A) can be used to store any number of functional components that are executable by the processor(s) 108(A). In many implementations, these functional components comprise instructions or programs that are executable by the processor(s) 108(A) and that, when executed, specifically configure the processor(s) 108(A) to perform the actions attributed above to the server(s) 102(A). Functional components stored in the computer-readable media can optionally include a workspace management component 116(A), a channel management component 118(A), a direct message (DM) management component 119(A), an operating system 120(A), and a datastore 122(A).

In at least one example, the workspace management component 116(A) can manage workspaces and the interoperability of domains associated therewith. That is, in at least one example, the communication platform can be partitioned, physically and/or logically, into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116(A) can manage workspace membership. That is, the workspace management component 116(A) can receive requests to associate users with individual workspaces and the workspace management component 116(A) can associate user accounts associated with such users with group identifiers associated with the individual workspaces. For example, responsive to receiving a request to add a user to a workspace, the workspace management component 116 (A) can associate a user account of the user with a group identifier of the workspace. The workspace management component 116(A) can disassociate user accounts and group identifiers, for example, when a user is removed from a workspace.

In some examples, different workspaces can be associated with different domains, as described herein. In at least one example, the workspace management component 116(A) can facilitate interoperability between workspaces with different domains. As described below, the communication platform can comingle or otherwise integrate two or more domains to enable functional components of the first workspace/first domain to be able to make cross-domain requests to the second workspace/second domain, and vice versa. Such cross-domain requests can be authenticated using one or more techniques. The workspace management component 116(A) can facilitate such cross-domain requests.

In at least one example, the workspace management component 116(A) can authenticate requests using cookies or other attributes. That is, when a request is sent from a user computing device 104, a functional component on the user computing device 104 (e.g., an application, a browser, etc.) can associate a cookie with the request. The cookie can indicate that the request was sent from the domain associated with the workspace presented via the user interface of the communication platform. In a SameSite cookie policy, the communication platform can designate whether the SameSite attribute of a response header, such as the Set-Cookie HTTP response header, is restricted to a first-party or same-site context (e.g., the first domain). In conventional techniques, when a request is associated with a cookie that is associated with a different "site" or "domain" than the domain with which the workspace management component 116(A) is associated, as is the case with a cross-domain request described herein, and a SameSite cookie policy is active, the workspace management component 116(A) can reject such a request. That is, in conventional techniques, the workspace management component 116(A) can receive a request, determine whether a header associated therewith comprises a cookie that is associated with a same domain with which the workspace management component 116(A) is associated (i.e., the first domain), and determine whether to accept or reject the request based on a determination of whether the cookie is associated with the same domain with which the workspace management component 116(A) is associated. In examples when a request is associated with the same domain, the workspace management component 116(A) accepts the request. However, in conventional technologies, when a request is associated with a different domain, the workspace management component 116(A) rejects the request in a SameSite cookie policy. In some examples, such a determination can be performed by a functional component on the user computing device 104 (e.g., an application, browser, etc.), such that if a request is associated with a different domain the request is not sent to the server(s) 102(A).

In at least one example, techniques described herein can enable the workspace management component 116(A) to accept requests from one or more domains. In at least one example, when a request is associated with a domain that is different than the first domain, and that domain has been designated as a first-party with respect to the first domain (i.e., "first-party" to the first domain associated with the workspace management component 116(A)), the workspace management component 116(A) can accept the request even though the request is associated with the different domain. In some examples, an application, a browser, or other functional component associated with the user computing device 104 can be configured to determine whether requests that are associated with cookies from different domains are to be treated as first-party and can associate first-party cookies with such requests. As such, even though a request originates from a third-party domain and is associated with a third-party cookie, if the third-party cookie/domain is associated with a list of domains that are to be treated as first-party, the application, browser, or other functional component associated with the user computing device 104 can associate the first-party cookie with the request. As such, the workspace management component 116(A) can accept the request at least in part because it is associated with the first-party cookie. In some examples, the application, web browser, or other client component can be configured to enable such behavior via a command-line flag or another modification thereto. In some examples, another access point (e.g., a browser) can be similarly configured.

In some examples, the communication platform can utilize an inline frame (i.e., an iframe), such as an HTML document embedded inside another HTML document on a website, for example, to enable cross-domain requests as described herein. In such examples, the workspace management component 116(A) can cause an iframe to be opened on a client and one or more requests can be proxied through the iframe using a particular message format, such as postMessage. In at least one example, an iframe to a first domain can be opened to a client associated with a second domain, wherein the iframe can hold credentials to the first domain and can be responsible for proxying requests, such as API requests, and socket connections. In such an example, the workspace management component 116(A) can cause the iframe associated with the first domain/server(s) 102(A) to be opened to a client associated with the second domain/server(s) 102(B). The iframe can hold credentials to the first domain and can receive requests, such as API requests, and socket connections, which can be routed to the first domain/server(s) 102(A) even though they were received via the client associated with the second domain/server(s) 102(B).

In some examples, tokens can be used to enable files or other data with a size above a threshold to be accessible via an iframe. In at least one example, the token can be individual file-scoped, time-limited tokens that can be used for accessing streams over an iframe bridge. In some examples, a token can be a one-time use token. In some examples, a token can be valid for a period of time or until an event occurs. In at least one example, an API can be used to validate access to a file based on a cookie token and can mint a file-scoped, time-limited token. That is, the workspace management component 116(A) (i.e., associated with the first domain) can mint a token that can be used by the second domain to access a file associated with the first domain. When the second domain requests access to the file associated with the first domain, it can send a request for a file-scoped token over an iframe proxy (presented by the first domain). The workspace management component 116 (A) can provide the token via the iframe. The second domain can then attach the token to the request to a particular location associated with the first domain and the first domain can therefore provide the file that corresponds to the token.

In some examples, the communication platform can utilize one or more application programming interfaces to enable different domains to be interoperable. For example, a CookiesAPI or other API can be used to allow authenticated requests from one domain to another domain. That is, requests can be associated with a particular header as provided by an API, which can be received by the workspace management component 116(A). Requests with said header can be authenticated regardless of which domain the requests are sent or received from.

The above-referenced techniques are provided as examples of how the communication platform, and more specifically, the workspace management component 116(A) can enable comingling and/or other integration of multiple workspaces that are associated with different domains on a client. It should be noted, however, that other implementations of such comingling and/or integration are within the scope of this disclosure.

In at least one example, the channel management component 118(A) can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118(A) can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118(A) can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118(A) can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message (DM) management component 119(A) can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message (DM) management component 119(A) can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message (DM) management component 119(A) can manage such communications and/or sharing of data. In some examples, data associated with a direct message can be presented via a user interface.

In at least one example, the operating system 120(A) can manage the processor(s) 108(A), computer-readable media 110(A), hardware, software, etc. of the server(s) 102.

In at least one example, the datastore 122(A) can be configured to store data that is accessible, manageable, and updatable. In some examples, the datastore 122(A) can be integrated with the server(s) 102, as shown in FIG. 1B. In other examples, the datastore 122(A) can be located remotely from the server(s) 102 and can be accessible to the server(s) 102 and/or user device(s), such as the user device 104. The datastore 122(A) can comprise multiple databases, which can include user data 124(A), permission data 126(A), workspace data 128(A), and channel and/or DM data 130(A). Additional or alternative data may be stored in the data store and/or one or more other data stores.

In at least one example, the user data 124(A) can store data associated with users of the communication platform. In at least one example, the user data 124(A) can store data in user profiles (which can also be referred to as "user accounts"), which can store data associated with a user, including, but not limited to, one or more user identifiers associated with multiple, different organizations or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In at least one example, users can have identifiers that indicate which workspaces they are associated with. In the context of multiple workspaces and/or domains, a user can be associated with a "globally unique" identifier such to avoid identifier collisions and mitigate risk associated with two or more users having the same identifier.

In at least one example, the permission data 126(A) can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124(A). In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126(A) can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126(A) can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data. In some examples, permissions can indicate restrictions on individual channels, restrictions on user(s) associated with individual channels, and the like.

In some examples, the permission data 126(A) can store data associated with permissions of individual messages or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message), or the like. In some examples, permissions associated with a message or other object can be mapped to, or otherwise associated with, data associated with the message or other object. In some examples, permissions can indicate viewing permissions, access permissions, editing permissions, etc.

In at least one example, the workspace data 128(A) can store data associated with individual workspaces. As described above, the communication platform can be partitioned into workspaces associated with groups of users. In at least one example, a group identifier can be associated with a workspace. In at least one example, the group identifier can indicate a physical address in the workspace data 128(A) where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122(A) (e.g., the user data 124(A), the permission data 126(A), the channel and/or DM data 130(A), etc.).

In at least one example, the channel and/or data 130(A) can store data associated with individual channels. In at least one example, the channel management component 118(A) can establish a channel between and among various user computing devices, allowing the user computing devices to communicate and share data between and among each other. In at least one example, a channel identification may be assigned to a channel, which indicates the physical address in the channel and/or DM data 130(A) where data related to that channel is stored. In at least one example, the channel and/or DM data 130(A) can store data associated with individual direct messages. In at least one example, the direct message (DM) management component 119(A) can establish a direct message between and among various user computing devices, allowing the user computing devices to communicate and share data between and among each other via the direct message. In at least one example, a direct message identifier may be assigned to a direct message, which indicates the physical address in the channel and/or DM data 130(A) where data related to that direct message is stored. Individual messages or other objects posted to a direct message can be stored in association with the channel and/or DM data 130(A). As described above, messages posted, or otherwise sent and/or received, via channels, direct messages, etc. can be stored in association with the channel and/or DM data 130(A). In some examples, such messages can additionally or alternatively be stored in association with the user data 124(A). In some examples, messages can be associated with individual permissions, as described herein.

In some examples, the datastore 122(A) can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), channels, direct messages, users, or the like.

In some examples, individual organizations can be associated with a database shard within the datastore 122(A) that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122(A) that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a channel can be associated with a database shard within the datastore 122(A) that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored.

In some examples, a direct message can be associated with a database shard within the datastore 122(A) that stores data related to a particular direct message identification. For example, a database shard may store electronic communication data associated with the direct message, which enables members of that particular direct message to communicate and exchange data with other members of the same direct message in real time or near-real time. In this example, a group or organization can be the owner of the database shard and can control where and how the related data is stored.

In some examples, individual users can be associated with a database shard within the datastore 122(A) that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112(A) can include one or more interfaces and hardware components for enabling communication with various other devices (e.g., the user computing device 104), such as over the network(s) 106 or directly. In some examples, the communication interface(s) 112(A) can facilitate communication via Web sockets, Application Programming Interfaces (APIs) (e.g., using API calls), HyperText Transfer Protocols (HTTPs), etc.

The server(s) 102(A) can further be equipped with various input/output devices 114(A) (e.g., I/O devices). Such I/O devices 114(A) can include a display, various user interface controls (e.g., buttons, joystick, keyboard, mouse, touch screen, etc.), audio speakers, connection ports and so forth.

In at least one example, and as illustrated in FIG. 1B, the server(s) 102(B) can have the same or similar configuration as the server(s) 102(A). That is, the server(s) 102(B) can have processor(s) 108(B), computer-readable media 110(B), communication interface(s) 112(B), input/output device(s) 114(B), workspace management component 116(B), channel management component 118(B), DM management component 119(B), operating system component 120(B), datastore 122(B), user data 124(B), permission data 126(B), workspace data 128(B), channel and/or DM data 130(B), which can be the same or similar as each of the components described with reference to the server(s) 102(A). In some examples, the server(s) 102(B) can be associated with less restrictive or more restrictive permissions and/or security. In some examples, the server(s) 102(B) can be associated with a different configuration than the server(s) 102(A). In some examples, the server(s) 102(B) can be associated with a party external to the communication platform with which the server(s) 102(A) are associated.

Returning to FIG. 1A, in at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108(A) and may be the same as or different than the processor(s) 108(A).

The computer-readable media 134 can comprise any of the types of computer-readable media 134 described above with reference to the computer-readable media 110(A) and may be the same as or different than the computer-readable media 110(A). Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102(A) and/or the server(s) 102(B) to access and/or use communication services available via the communication platform. In at least one example, the application 140 can facilitate the exchange of data between and among various other user computing devices, for example via the server(s) 102(A) and/or the server(s) 102(B). In some examples, the application 140 can append data, such as a header and/or token, to outgoing communication. In some examples, the data can indicate a source of the outgoing communication, which can indicate the workspace and/or domain from which the communication originates.

As described above, in some examples to facilitate interoperability between multiple domains associated with multiple workspaces, the application 140 can be configured to operate in multiple modes, which can enable authentication and/or communication with each of the multiple domains. In some examples, a download can be initialized to configure the application 140 into individual of the modes. In at least one example, the application 140 can be configured so that cookies from different domains that have been designated as acceptable to the communication platform are treated as SameSite, or "first party," cookies in the SameSite cookie policy. That is, in some examples, the application 140 can determine whether a request is associated with a domain that has been designated as a first-party with respect to the second domain (i.e., to the intended recipient) and, if the request is associated with such a domain, the application 140 can associate a first-party cookie with the request so that the intended recipient, which is associated with the first-party with respect to the second domain, can accept the request. In some examples, the application 140 can be configured to enable such behavior via a command-line flag or another modification thereto.

In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1A. As illustrated in FIG. 1A, the user interface 144 can present data associated with one or more channels and, in some examples, one or more workspaces. That is, in some examples, the user interface 144 can enable a user to access multiple workspaces. In some examples, the user interface 144 can include a first section 146 (e.g., which can be a portion, pane, or other partitioned unit of the user interface 144) that includes user interface element(s) associated with workspace(s) with which the user (e.g., account of the user) is associated. Two user interface elements are illustrated in FIG. 1A, a first user interface element 147(A) and a second user interface element 147(B). The first user interface element 147(A) can represent a workspace with which the server(s) 102(A) are associated and the second user interface element 147(B) can represent a workspace with which the server(s) 102(B) are associated. As described above, such workspaces can be associated with different domains. In some examples, a user can interact with the first user interface element 147(A) or the second user interface element 147(B) to access the corresponding workspace. In some examples, a user can be prompted to provide a credential to authenticate with the corresponding workspace. While two user interface elements are illustrated, any number of user interface elements can be presented via the first section 146, which can be associated with one or more domains.

In some examples, the user interface 144 can include a second section 148 (e.g., which can be a portion, pane, or other partitioned unit of the user interface 144) that includes user interface element(s) representing data associated with the workspace(s) with which the user (e.g., account of the user) is associated. In some examples, user interface element(s) presented via the second section 148 can represent virtual space(s) with which the user has access via a particular workspace or multiple workspaces. Additional details are provided below.

In at least one example, the user interface 144 can include a third section 150 (e.g., which can be a portion, pane, or other partitioned unit of the user interface 144) that can be associated with a data feed (or "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the third section 150 can be associated with the same or different workspaces. That is, in some examples, the third section 150 can present data associated with the same or different workspaces via an integrated feed. In some examples, the data can be organized and/or is sortable by workspace, time (e.g., when associated data is posted or an associated operation is otherwise performed), type of action, channel, user, or the like. In some examples, such data can be associated with an indication of which user (e.g., member of the channel) posted the message and/or performed an action. In examples where the third section 150 presents data associated with multiple workspaces, at least some data can be associated with an indication of which workspace the data is associated with.

In at least one example, the first section 146, the second section 148, and the third section 150, in combination, can be associated with a "group-based communication user interface" from which a user can interact with the communication platform. Additional details associated with the user interface 144 are described below with reference to FIGS. 2A and 2B.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116(A) or 166(B), the channel management component 118(A) or 118(B), the DM management component 119(A) or 119(B), and the application 140, techniques described herein can be performed by any other component, or combination of components, which can be associated with the server(s) 102(A), the server(s) 102(B), the user computing device 104, or a combination thereof.

Figure 2A:
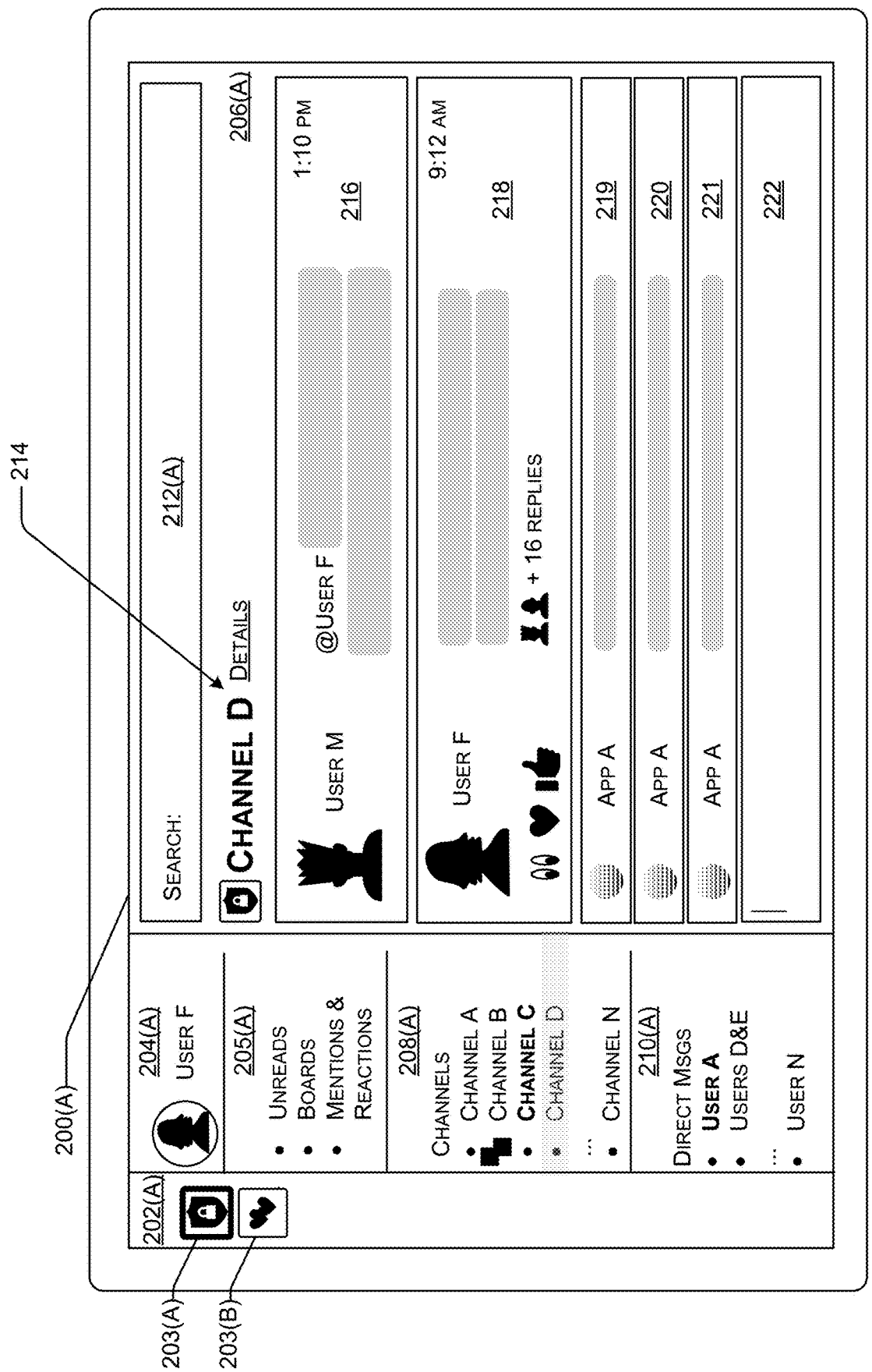
FIG. 2A illustrates an example user interface that presents an instance of a first workspace with which a user is associated, as described herein.
Figure 2B:
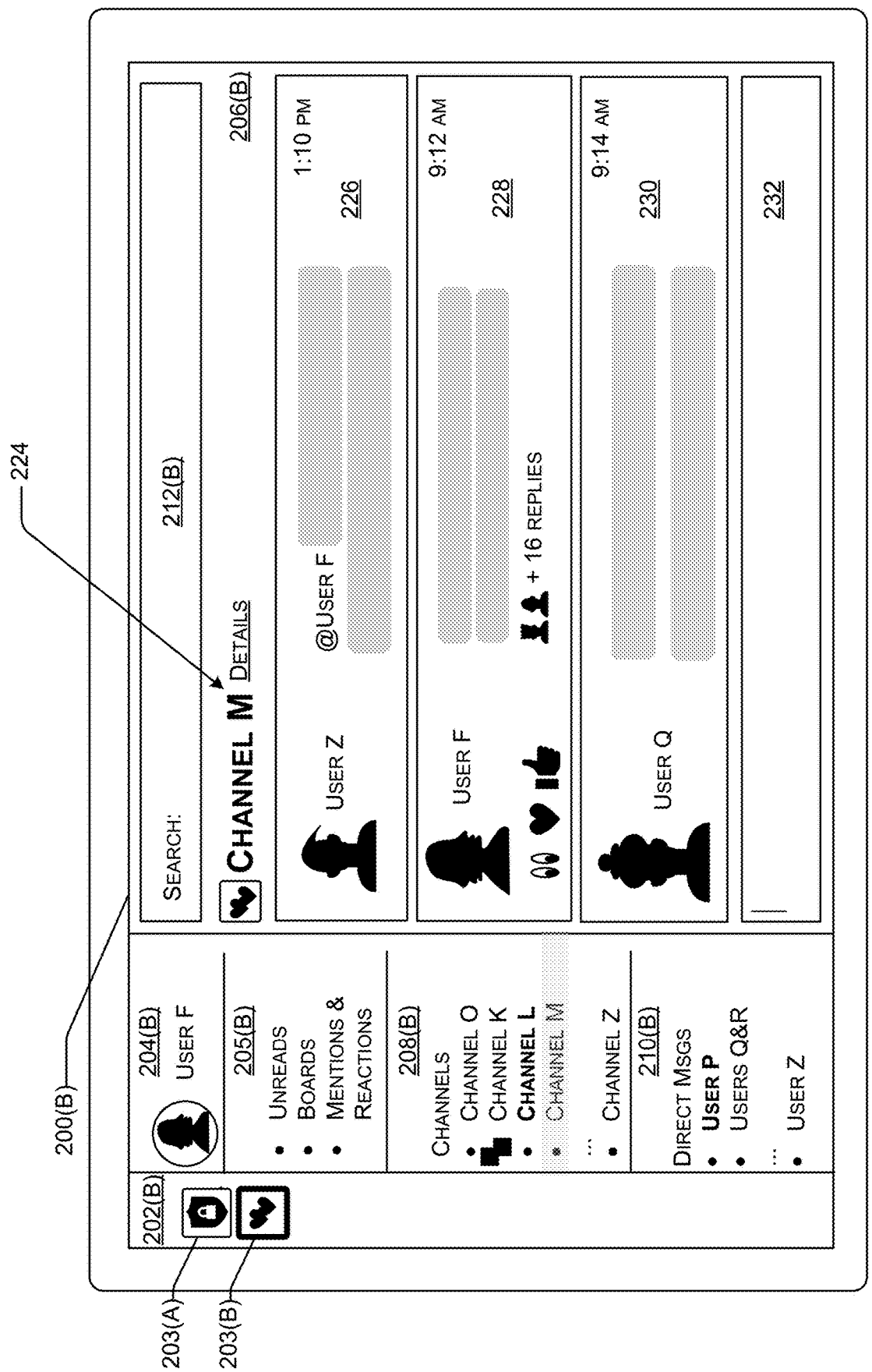
FIG. 2B illustrates the example user interface of FIG. 2A, wherein the user interface presents an instance of a second workspace with which the user of FIG. 2A is associated, as described herein.
Figure 3:
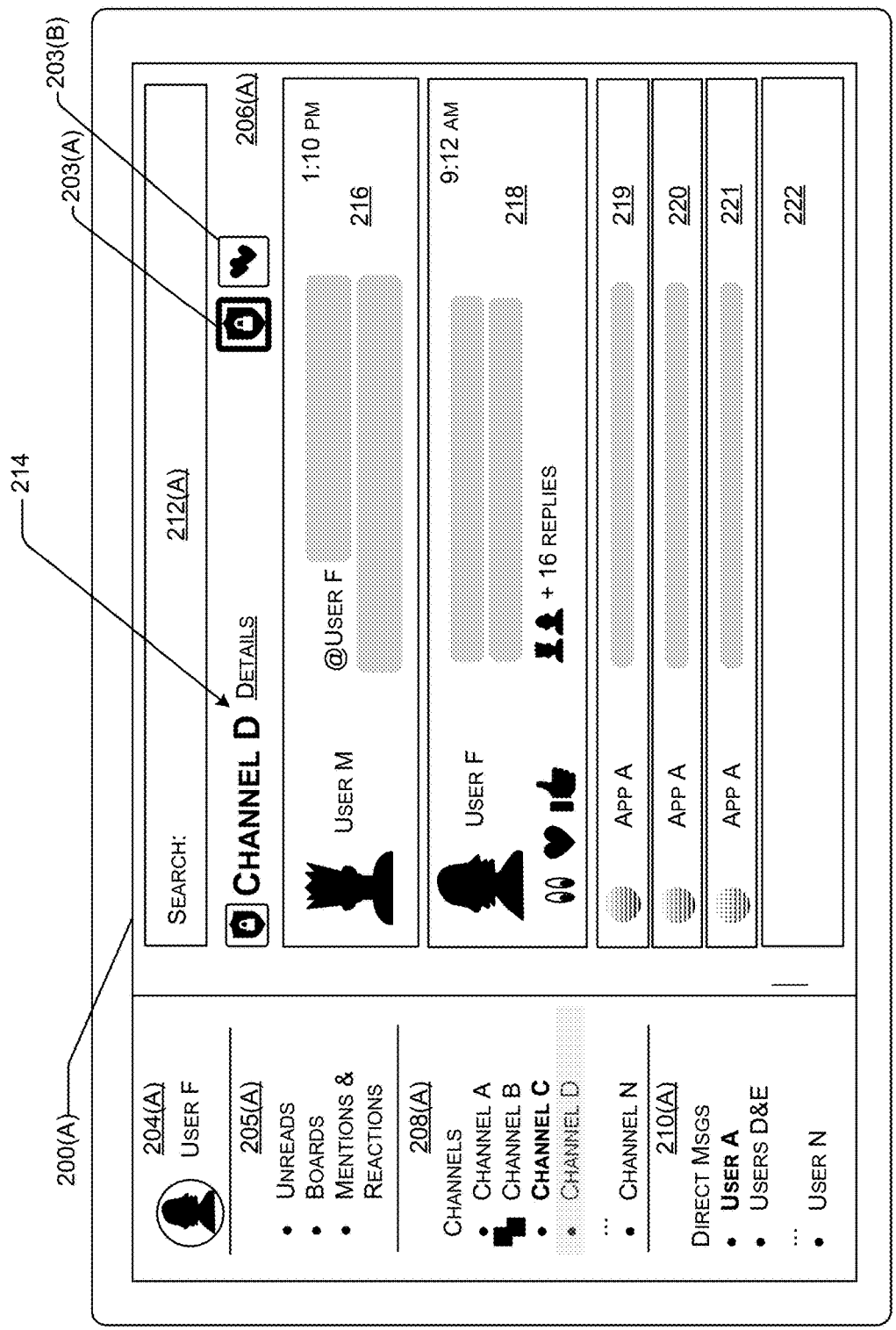
FIG. 3 illustrates an example of the user interface of FIG. 2A that is configured to enable a user to access different workspaces, as described herein.

FIGS. 2A, 2B, and 3 illustrate examples of the user interface 144, wherein data associated with multiple workspaces is displayed in a same client view. FIG. 2A illustrates an example user interface 200(A) presented via a communication platform, as described herein. The user interface 200(A), which can be an instance of the user interface 144, can correspond to the user interface 144 described above with reference to FIG. 1A. As described above, in some examples, a user interface 200(A) presented via the communication platform can include a first section 202(A) (which can correspond to the first section 146 described above with reference to FIG. 1A) that includes user interface element(s) representing workspaces with which the user (e.g., User F) is associated.

As illustrated in FIG. 1A, the user is associated with two workspaces, which are represented by user interface element 203(A) and user interface element 203(B). As described above, a first workspace represented by the user interface element 203(A) can be associated with a first domain and the server(s) 102(A). A second workspace represented by the user interface element 203(B) can be associated with a second domain and the server(s) 102(B). In at least one example, the user interface elements 203(A) and 203(B) can be interactable such that an interaction with one of the user interface elements can cause data associated with the corresponding workspace to be presented via the user interface 200(A) regardless of which domain the data is accessed from. That is, the user interface elements 203(A) and 203(B) can operate as a toggle in the user interface 200(A) that facilitates access to each of the workspaces via a single client view. In at least one example, depending on which workspace the user is accessing services of the communication platform through, a corresponding instance of the workspace can be presented via the user interface 200(A).

In at least one example, the user interface 200(A) can include a second section 204(A) that can correspond to the second section 148 described above with reference to FIG. 1A. The second section 204(A) can include user interface element(s) representing virtual space(s) associated with the workspace(s) with which the user (e.g., account of the user) is associated. In at least one example, the second section 204(A) can include one or more sub-sections, which can represent different virtual spaces. For example, a first sub-section 205(A) can include user interface elements representing virtual spaces that can aggregate data associated with a plurality of channels and/or workspaces. In at least one example, each virtual space can be associated with a user interface element in the first sub-section 205(A). In some examples, a user interface element can be associated with an actuation mechanism, that when actuated, can cause the application 140 to present data associated with the corresponding virtual space via a third section 206(A) of the user interface 200(A) (which can correspond to the third section 150 described above with reference to FIG. 1A). In at least one example, the virtual spaces represented by user interface elements in the second section 204(A) can be particular to the workspace from which the user interface 200(A) is being accessed. In some examples, the virtual spaces represented by user interface elements in the second section 204(A) can be associated with multiple workspaces.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third section 206(A), for example in a feed.

In another example, "drafts" can be associated with messages or other objects that have not yet been posted to a virtual space or otherwise sent to a receiving entity. In at least one example, a message, while being composed, can be associated with an indicator indicating that the message is a draft and can therefore be associated with the "drafts" referenced in the first sub-section 205(A).

In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 205(A) includes a user interface element representative of a virtual space associated with "clips" that is actuated by a user, clips associated with the user, which can be associated with different channels and/or virtual spaces, can be presented via the third section 206(A). In some examples, such clips can be presented via a feed. For the purpose of this discussion, a clip can correspond to audio and/or visual content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200(A) (e.g., in the third section 206(A)). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like.

In some examples, a virtual space can be associated with all meetings with which a user is associated (e.g., a "virtual meeting hub"). That is, in some examples, if the user requests to access the virtual space associated with "meetings" (or something of the like), meetings with which the user is associated can be presented in the third section 206(A), for example in a feed.

In some examples, data presented via the third section 206(A) can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) (e.g., member(s) of a channel) posted a message, performed an action, and/or the like. Additional details are described below.

In at least one example, the second section 204(A) of the user interface 200(A) can include a second sub-section 208(A) that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208(A) can depict all channels, or a subset of all channels, that the user has permission to access (e.g., as determined by the permission data). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208(A) can depict all channels, or a subset of all channels, that the user is a member of, and the user can interact with the user interface 200(A) to browse or view other channels that the user is not a member of but are not currently displayed in the second sub-section 208(A). In some examples, a new channel, generated subsequent to a request received at the channel management component 118(A) in FIG. 1A and accessible to the user, can be added to the second sub-section 208(A). The new channel can be generated by the user or added to the second sub-section 208(A) in reply to acceptance of an invite sent to the user to join a new channel. In some examples, different types of channels (e.g., public, private, shared, etc.) can be in different sections of the second sub-section 208(A), or can have their own sub-sections or sub-sections in the user interface 200(A). In some examples, channels associated with different workspaces can be in different portions of the second sub-section 208(A), or can have their own sections or sub-sections in the user interface 200(A). In some examples, channels associated with other workspaces may not be accessible, nor presented via the user interface 200(A), unless the user is authenticated with the workspace with which such channels are associated.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208(A) of the user interface 200(A). In such examples, the user may navigate to a different interface (not shown) to browse additional channels that are accessible to the user but to which the user is not currently a member.

In addition to the second sub-section 208(A), the second section 204(A) can include a third sub-section 210(A) that can include user interface elements representative of direct messages. That is, the third sub-section 210(A) can include user interface elements representative of virtual spaces that are associated with private messages between one or more users, as described above.

As described above, in at least one example, the user interface 200(A) can include a third section 206(A) that can be associated with data associated with virtual spaces of the communication platform. In some examples, data presented via the third section 206(A) can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the third section 206(A) can be associated with the same or different workspaces. That is, in some examples, the third section 206(A) can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user(s) and/or entity(s) posted the message and/or performed an action.

A "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data and/or content that can be presented via the third section 206(A) of the user interface 200(A) include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the third section 206(A) can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission (s), etc.).

In at least one example, the user interface 200(A) can include a search mechanism 212(A), wherein a user can input a search term and the server(s) 102(A) can perform a search associated with the communication platform. In some examples, the search can be performed across each group with which the user is associated, or the search can be restricted to a particular group, based on a user specification. The search may be performed with one or more shards associated with each group across which the search is performed.

In FIG. 2A, the user can interact with the user interface element that corresponds to Channel D in the second sub-section 208(A) and as such, a feed associated with the channel can be presented via the third section 206(A) of the user interface. In some examples, the third section 206(A) can be associated with a header that includes user interface elements 214 representing data associated with Channel D. Such data can indicate which workspace is being accessed via the user interface 200(A), whether the channel is private, public, shared, or the like, etc. Furthermore, the third section 206(A) can include user interface elements 216, 218, 219, 220, and 221 which each represent messages posted to the channel. As illustrated, the user interface elements representative of the messages 216-221 can include an indication of user(s) and/or entity(s) that posted the message, a time when the message was posted, content associated with the message, reactions associated with the message (e.g., emojis, reactjis, etc.), and/or the like. In at least one example, the third section 206(A) can include an input mechanism 222, which can be associated with a composition user interface to enable a user to compose a message to be posted to the channel. That is, in at least one example, a user can provide input via the input mechanism 222 (e.g., type, speak, etc.) to generate a new message. In some examples, messages can be generated by applications and/or automatically by the communication platform. In some examples, the third section 206(A) can include user interface elements representative of other objects and/or data associated with the channel (or other virtual space).

The user interface 200(A) illustrated and described in FIG. 2A is an example of an instance of the user interface 200(A) that is associated with the first workspace (e.g., represented by user interface 203(A)). That is, an instance of the first workspace is presented via the instance of the user interface 200(A). In at least one example, each of the channels, direct messages, user profiles, reactions (e.g., emojis or reactjis), files, etc. presented by and/or accessible via the instance of the user interface 200(A) illustrated in FIG. 2A are associated with the first workspace and therefore are stored and/or managed by the server(s) 102(A).

FIG. 2B illustrates a second instance of the user interface 200(B) that is associated with the second workspace (e.g., represented by user interface 203(B)). That is, an instance of the second workspace is presented via the instance of the user interface 200(B). In some examples, the second workspace can be accessible via an interaction with the user interface element 203(B). In some examples, the user can be prompted to provide credentials for accessing the second workspace before the user interface 200(B) is updated to present data associated with the second user interface. That is, an authentication request can be presented via the user interface 200(A) prior to the instance of the second workspace being presented via the user interface 200(B). In at least one example, the first section 202(B), the second section 204(B), the third section 206(B), the first sub-section 205(B), the second sub-section 208(B), the third sub-section 210(B), the search mechanism 212(B), etc. can have the same or similar functionality as each of the components described above with reference to FIG. 2A.

In at least one example, each of the channels, direct messages, user profiles, reactions (e.g., emojis or reactjis), files, etc. presented by and/or accessible via the instance of the user interface 200(B) illustrated in FIG. 2B are associated with the second workspace and therefore are stored and/or managed by the server(s) 102(B). That is, the channels identified in the second sub-section 208(B) and the direct messages identified in the third sub-section 210(B) can be particular to the second workspace. As illustrated in FIG. 2B, Channel M, which is associated with the second workspace, is selected and data associated therewith is presented via the third section 206(B). In at least one example, the third section 206(B) can include user interface element(s) 224 representative of channel data. One or more messages 226, 228, and 230 can be presented via the third section 206(B), for example, in a feed. The user interface 200(B) can include an input mechanism 232 to enable the user to input data, as described above with respect to the input mechanism 222 of FIG. 2A.

In at least one example, the workspace management components 116(A) and/or 116(B) can facilitate the presentation of data from different workspaces via instances of the user interface 200(A) and/or 200(B) such that the user does not need to navigate to different user interfaces. Additional details are described above and below with respect to how such interoperability and/or accessibility is accomplished. FIGS. 2A and 2B illustrate an example of how a user can access instances of different workspaces, for example, by interacting with the user interface elements 203(A) and 203(B) as presented via the first section of each of the instances of the user interface.

In at least one example, a client fetched from one of the domains can make requests against other domains (or vice versa) via techniques described herein. That is, a client fetched from the first domain/server(s) 102(A) can make requests against the second domain/server(s) 102(B) or a client fetched from the second domain/server(s) 102(B) can make requests against the first domain/server(s) 102(A). Techniques for facilitating cross-domain requests and/or communication are described above. For example, modifications to the SameSite cookie policy, iframes, API(s), and/or the like can facilitate such cross-domain request authentication and/or communication.

FIG. 3 illustrates another example of how a user can access different workspaces from within a same client view (i.e., a same user interface). FIG. 3 illustrates a variation of the user interface 200(A) of FIG. 2A. In FIG. 3, the user interface elements 203(A) and 203(B) are shown in the third section 206(A). That is, in FIG. 3, the first section 202A is omitted and the user interface elements 203(A) and 203(B) are presented in a different location. A user can interact with the user interface elements 203(A) and 203(B) to toggle between the workspaces. As described above, in some examples, the user can be prompted, via an authentication request, to enter credentials for accessing a particular workspace before data associated with such a workspace can be presented via the respective instance of the user interface 200(A) or 200(B).

While FIGS. 2A, 2B, and 3 illustrate examples where different instances of a user interface and/or different instances of different workspaces can be presented via a same client view, in some examples, while not illustrated herein, a user can have concurrent access to multiple workspaces such as via side-by-side instances or multiple, independent windows in a concurrent user experience with the application 140.

Figure 4:
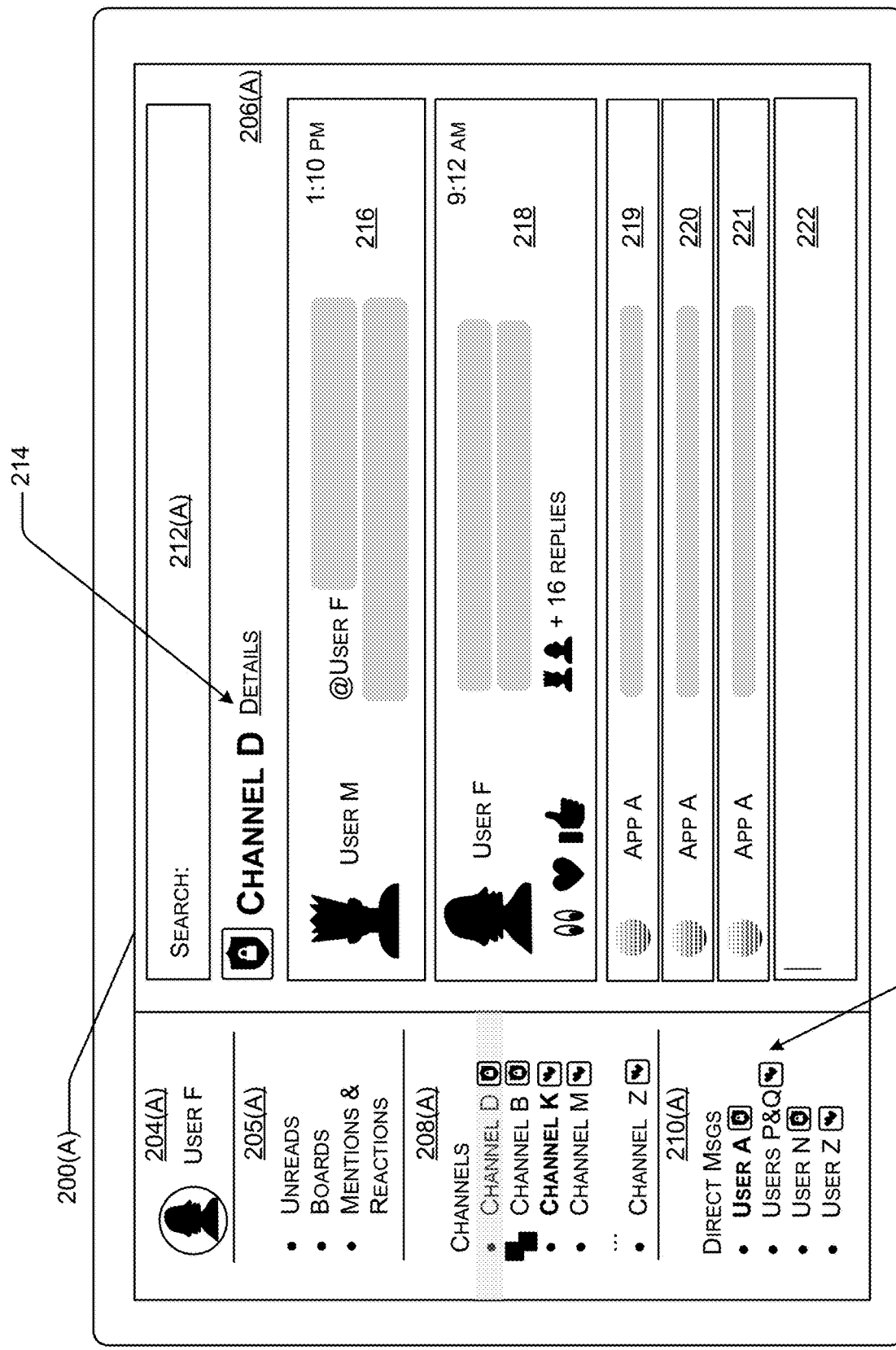
FIG. 4 illustrates an example of the user interface of FIG. 2A that presents data associated with multiple workspaces and enables a user to access data from multiple workspaces, as described herein.

FIG. 4 illustrates an example user interface that presents data associated with multiple workspaces and enables a user to access data from multiple workspaces, as described herein. FIG. 4 illustrates an example of the instance of the user interface 200(A) with a modified configuration. Instead of presenting user interface elements 203(A) and 203(B), the user interface 200(A) in FIG. 4 is an integrated user interface. In some examples, channels, direct messages, user profiles, files, etc. associated with different workspaces can be presented via a single, integrated user interface as presented in FIG. 4. In such examples, user interface element(s) 400 representative of individual workspaces can be presented in association with each of the channels, direct messages, user profiles, files, etc. to visually signal to the user which workspace each virtual space and/or object (e.g., channels, direct messages, user profiles, files, etc.) is associated with. In some examples, a user can be prompted to provide credentials to access individual virtual spaces and/or objects.

In some examples, when the user interface 200(A) is an integrated user interface from which data associated with multiple workspaces is accessed and/or presented, the third section 206(A) can present data associated with the same or different workspaces, for example, when a user accesses a virtual space that aggregates data across channels, direct messages, etc. (e.g., unreads, boards, threads, mentions and reactions, etc.). That is, in some examples, the third section 150 can present data associated with the same or different workspaces via an integrated feed. In some examples, the data can be organized and/or is sortable by workspace, time, type of action, channel, user, or the like. In some examples, such data can be associated with an indication of which user posted the message and/or performed an action. In examples where the third section 206(A) presents data associated with multiple workspaces, at least some data can be associated with an indication of which workspace the data is associated with.

FIGS. 1-4 make reference to "user interface elements." A user interface element can be any element of the user interface that is representative of an object, message object, virtual space, and/or the like. A user interface element can be a text element, a graphical element, a picture, a logo, a symbol, and/or the like. In some examples, a user interface element can be presented as a pop-up, overlay, new sections of the user interface 200(A) or 200(B), a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102(A) and/or 102(B). In some examples, the server(s) 102(A) and/or 102(B) can send data and/or instructions to the application 140 to generate new user interfaces and/or update the user interface 200(A) or 200(B), as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting. Further, to the extent an operation is described as being performed by the application 140, such an operation can be performed by a browser or other functional component associated with the user computing device 104.

Figure 5:
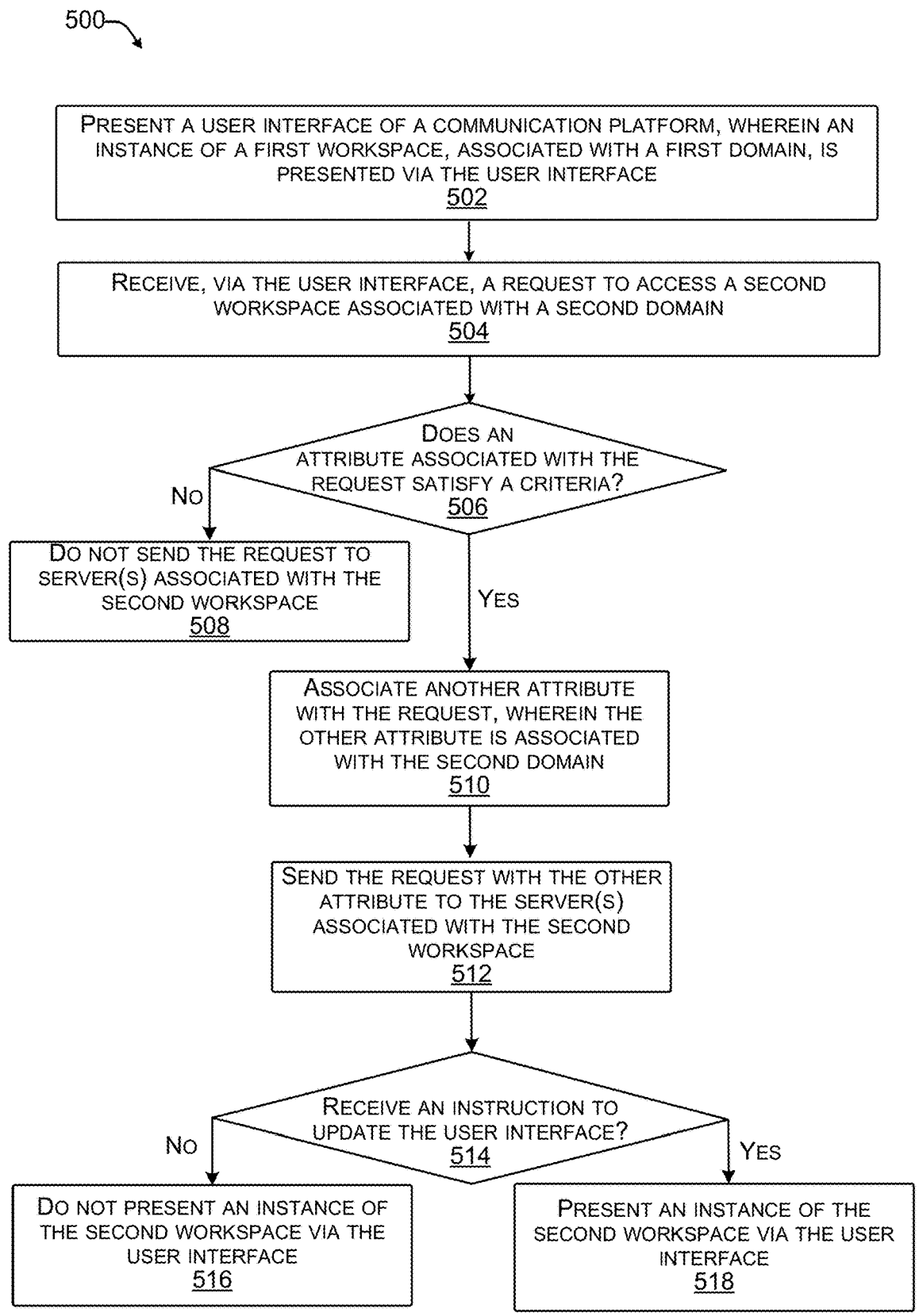
FIG. 5 illustrates an example process associated with agnostic domain communication as described herein.
Figure 6:
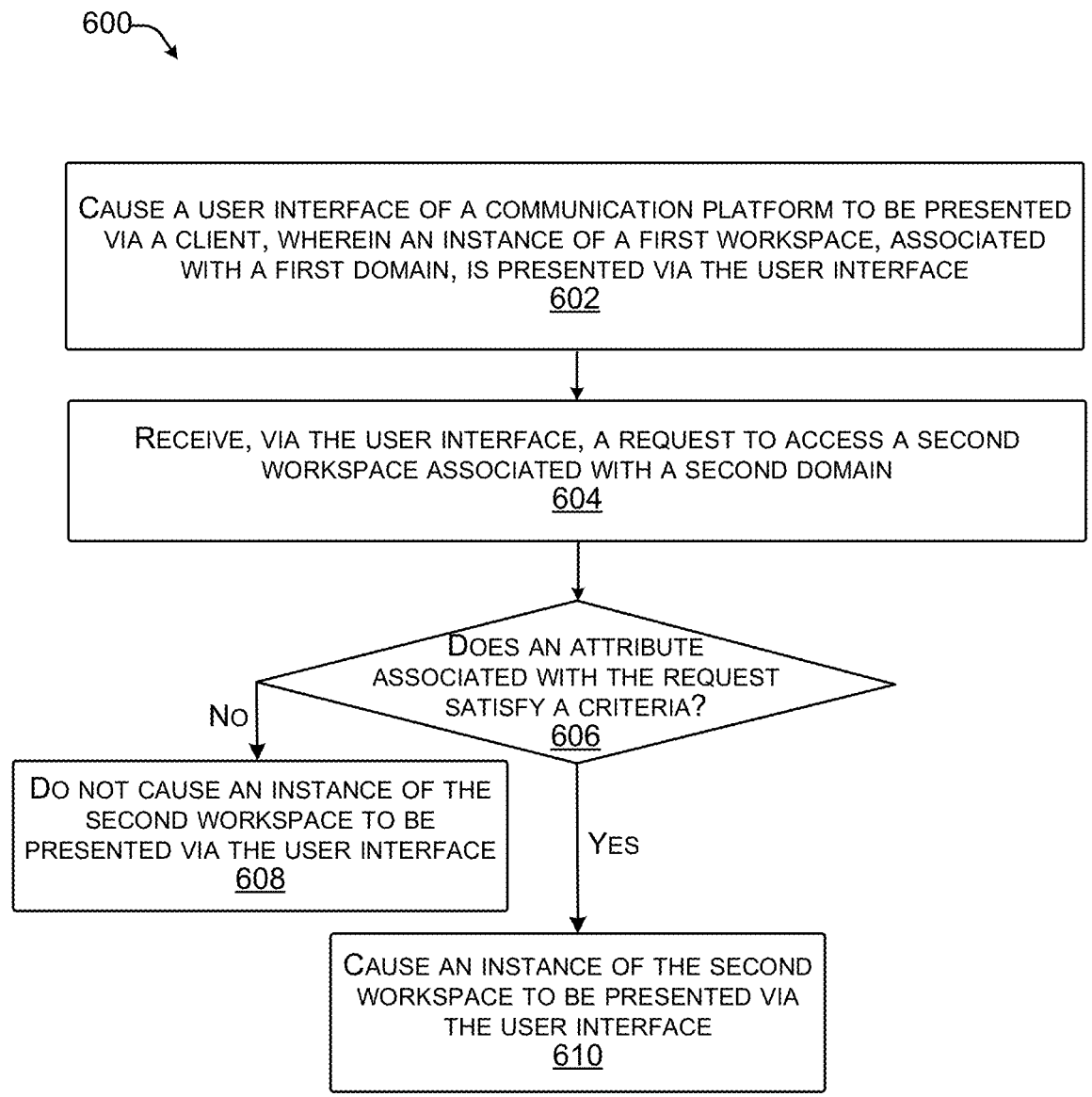
FIG. 6 illustrates an example process associated with agnostic domain communication, as described herein.

FIGS. 5 and 6 are flowcharts showing example processes involving techniques as described herein. The processes illustrated in FIGS. 5 and 6 are described with reference to components described above with reference to the environment 100 shown in FIGS. 1A and 1B for convenience and ease of understanding. However, the processes illustrated in FIGS. 5 and 6 are not limited to being performed using the components described above with reference to the environment 100. Moreover, the components described above with reference to the environment 100 are not limited to performing the processes illustrated in FIGS. 5 and 6.

The processes in FIGS. 5 and 6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5 and 6 can be combined in whole or in part with each other or with other processes.

FIG. 5 illustrates an example process 500 associated with agnostic domain communication, as described herein.

At operation 502, the application 140 can present a user interface of a communication platform, wherein an instance of a first workspace, associated with a first domain, is presented via the user interface. In at least one example, a user can be associated with one or more workspaces. In at least one example, a first workspace with which the user is associated can be associated with a first domain. The first domain can be associated with a first set of server(s), such as the server(s) 102(A). In at least one example, the application 140 can present a user interface, which can be associated with the first workspace. That is, in at least one example, an instance of the first workspace can be presented via the user interface. One or more virtual spaces, user profiles, files, reactions, and/or the like that are associated with the first workspace can be presented via the instance of the first workspace presented via the user interface. An example of such a presentation is provided above with reference to FIG. 2A. In at least one example, when a communication, such as a request, is sent from the application 140 to the server(s) 102(A), the communication is associated with a cookie to indicate the source of the communication (e.g., the first domain). The use of cookies in such a way can provide authentication.

At operation 504, the application 140 can receive, via the user interface, a request to access a second workspace associated with a second domain. In at least one example, the user interface can include one or more affordances (e.g., interactable user interface element(s)) to enable a user to access data associated with different workspaces. In some examples, such workspaces can be associated with different domains, as described above. In at least one example, a second workspace with which the user is associated can be associated with a second set of server(s), such as the server(s) 102(B), such that each of the domains and workspaces are physically separated.

In at least one example, the application 140 can receive an input indicating that a user wants to access the second workspace associated with the second domain. In at least one example, the input can be associated with a user interface element that corresponds to the second domain. The application 140 can send a request to access the second domain to the server(s) 102(B). In at least one example, the request can be associated with a cookie associated with the first domain. The cookie can be an "attribute" associated with the request.

At operation 506, the application 140 can determine whether an attribute associated with the request satisfies a criteria. In at least one example, the application 140 can receive the request. As described above, the request can be associated with an attribute, such as a cookie, which can be associated with the first domain. The application 140 can determine whether the attribute satisfies a criteria, which in some examples, can comprise association with a domain that is designated as a first-party with respect to the second domain. For example, the application 140 can determine whether the first domain is associated with the list of domains that are designated as first-party to the second domain. That is, in some examples, the application 140 can determine whether the request is associated with an attribute (e.g., a cookie) that satisfies a criteria (i.e., association with a domain that has been designated as a first-party with respect to the second domain). If the attribute associated with the request does not satisfy the criteria, the application 140 can refrain from sending the request to the server(s) 102(B) associated with the second workspace, as illustrated at operation 508.

If the attribute associated with the request satisfies the criteria, the application 140 can associate another attribute with the request, wherein the other attribute is associated with the second domain, as illustrated at operation 510. In at least one example, if the request is associated with an attribute that satisfies the criteria—that is, if the request is associated with a cookie that is associated with a domain that is designated as a first-party to the second domain—the application 140 can associate a first-party cookie (i.e., a cookie associated with the second domain) with the request so that the server(s) 102(B), which are associated with the second domain, can accept the request. In some examples, the application 140 can be configured to enable such behavior via a command-line flag or another modification thereto. The application 140 can send the request with the other attribute to the server(s) 102(B) associated with the second workspace, as illustrated at operation 512.

At operation 514, a determination of whether an instruction to update the user interface is received by the application 140 can be made. In at least one example, the server(s) 102(B) can send an instruction to the application 140 to update the user interface with an instance of the second workspace. In an example where an instruction is not received, the application 140 can refrain from presenting an instance of the second workspace via the user interface, as illustrated at operation 516. In an example where an instruction is received, the application 140 can present an instance of the second workspace via the user interface, as illustrated at operation 518. That is, the application 140 can receive an instruction from the server(s) 102(B) and can update the user interface with an instance of the second workspace such that one or more virtual spaces, user profiles, files, reactions, and/or the like that are associated with the second workspace can be presented via the instance of the second workspace presented via the user interface. An example of such a presentation is provided above with reference to FIG. 2B. As described above, in some examples, the user can be prompted to enter credentials for accessing the second workspace before the instance of the second workspace and data associated with the second workspace can be presented via the user interface.

As described above, in some examples to facilitate interoperability between multiple domains associated with multiple workspaces, the application 140 can be configured to operate in multiple modes, which can enable authentication and/or communication with each of the multiple domains. In some examples, a download can be initialized to configure the application 140 into individual of the modes. In at least one example, the application 140 can be configured so that cookies from different domains that have been designated as acceptable to the communication platform are treated as SameSite cookies in the SameSite cookie policy. In some examples, the application 140 can be configured to enable such behavior via a command-line flag or another modification thereto such that requests sent via the application 140 can be received by a different domain than the domain from which such requests originate. That is, the application 140 can be configured to facilitate comingling or other integration of the first domain and the second domain from within the same client. While FIG. 5 is described with reference to performance by the application 140, in additional or alternative examples, a browser or other functional component associated with the user computing device 104 can perform the same or similar operations.

FIG. 6 illustrates an example process 600 associated with agnostic domain communication, as described herein.

At operation 602, the workspace management component 116(A) can cause a user interface of a communication platform to be presented via a client (e.g., the application 140 of the user computing device 104), wherein an instance of a first workspace, associated with a first domain, is presented via the user interface. As described above, in at least one example, a user can be associated with one or more workspaces. In at least one example, a first workspace with which the user is associated can be associated with a first domain. The first domain can be associated with a first set of server(s), such as the server(s) 102(A).

In at least one example, the workspace management component 116(A) can send instructions to the application 140 to cause the application 140 to present a user interface, which can be associated with the first workspace. That is, in at least one example, an instance of the first workspace can be presented via the user interface. One or more virtual spaces, user profiles, files, reactions, and/or the like that are associated with the first workspace can be presented via the instance of the first workspace presented via the user interface. An example of such a presentation is provided above with reference to FIG. 2A.

In at least one example, the user interface can include one or more affordances to enable a user to access one or more workspaces with which the user is associated. In at least one example, an affordance can be a user interface element that is interactable such to signal an input. In at least one example, the application 140 can detect an input associated with a user interface element that corresponds to a second workspace, different than the first workspace, with which the user is associated. In at least one example, the application 140 can send a request to access the second domain to the server(s) 102(B). In at least one example, because the request originated from the first domain, the application 140 can associate a cookie associated with the first domain with the request to indicate the source of the communication. The use of cookies in such a way can provide authentication.

As described above, in at least one example, the cookie associated with the first domain can correspond to an attribute of the request. The application 140 can determine whether the attribute satisfies a criteria. In at least one example, the criteria can correspond to association with a domain that is on a list of domains that are designated as first-party with respect to the second domain. In at least one example, based at least in part on determining that the first domain is designated as a first-party with respect to the second domain, the application 140 can associate another attribute (e.g., another cookie) that is associated with the second domain with the request.

At operation 604, the workspace management component 116(B) can receive, via the user interface, a request to access a second workspace associated with a second domain. In at least one example and as described above, the user interface can include one or more affordances to enable a user to access data associated with different workspaces. In some examples, such workspaces can be associated with different domains, as described above. In at least one example, a second workspace with which the user is associated can be associated with a second set of server(s), such as the server(s) 102(B), such that each of the domains and workspaces are physically separated.

In at least one example and as described above, the application 140 can receive an input indicating that a user wants to access the second workspace associated with the second domain. The application 140 can send a request to access the second domain to the server(s) 102(B). In at least one example, the request can be associated with a cookie associated with a domain. Such a cookie, as described above, can comprise an "attribute" associated with the request.

At operation 606, the workspace management component 116(B) can determine whether the attribute satisfies a criteria. In at least one example, the workspace management component 116(B) can receive the request and can determine whether the attribute satisfies a criteria. In at least one example, such a criteria can correspond to association with the second domain. For example, the workspace management component 116(B) can determine whether the cookie associated with the request is associated with the second domain.

At operation 608, the workspace management component 116(B) can refrain from causing an instance of the second workspace from being presented via the user interface. In at least one example, based at least in part on a determination that the attribute does not satisfy at least the criteria, the workspace management component 116(B) can refrain from causing an instance of the second workspace from being presented via the user interface.

At operation 610, the workspace management component 116(B) can cause an instance of the second workspace to be presented via the user interface. In at least one example, based at least in part on a determination that the attribute satisfies at least the criteria, the workspace management component 116(B) can cause an instance of the second workspace from being presented via the user interface. As described above, techniques described herein can enable the workspace management component 116(B) to accept requests from one or more domains. In at least one example, when a request is associated with a domain that is different than the second domain, and that domain has been designated as a first-party with respect to the second domain (i.e., "first-party" to the second domain associated with the workspace management component 116(B)), the workspace management component 116(B) can accept the request even though the request originated from a different domain. As such, the workspace management component 116(B) can accept the request at least in part because it is associated with the first-party cookie, that is, because the attribute associated with the request satisfies at least the criteria. Based at least in part on determining that the attribute associated with the request satisfies the criteria, the workspace management component 116(B) can send instructions to the application 140 to update the user interface with an instance of the second workspace such that one or more virtual spaces, user profiles, files, reactions, and/or the like that are associated with the second workspace can be presented via the instance of the second workspace presented via the user interface. An example of such a presentation is provided above with reference to FIG. 2B. As described above, in some examples, the user can be prompted to enter credentials for accessing the second workspace before the instance of the second workspace and data associated with the second workspace can be presented via the user interface.

As described above, in addition to SameSite cookie techniques, additional or alternative techniques can be implemented to enable comingling or other integration of workspaces associated with different domains. For example, in some examples, the communication platform can utilize an inline frame (i.e., an iframe), such as an HTML document embedded inside another HTML document on a website, for example, to enable cross-domain requests as described herein. In such examples, the workspace management component 116(B) can cause an iframe to be opened on a client and one or more requests can be proxied through the iframe using a particular message format, such as postMessage. In at least one example, an iframe to a second domain can be opened to a client associated with a first domain, wherein the iframe can hold credentials to the second domain and can be responsible for proxying requests, such as API requests, and socket connections. In such an example, the workspace management component 116(B) can cause the iframe associated with the second domain/server(s) 102(B) to be opened to a client associated with the first domain/server(s) 102(A). The iframe can hold credentials to the second domain and can receive requests, such as API requests, and socket connections, which can be routed to the second domain/server(s) 102(B) even though they were received via the client associated with the second domain/server(s) 102(A). In some examples, tokens can be used to enable files or other data with a size above a threshold to be accessible via an iframe, as described above.

In some examples, the communication platform can utilize one or more application programming interfaces to enable different domains to be interoperable. For example, a CookiesAPI or other API can be used to allow authenticated requests from one domain to another domain. That is, requests can be associated with a particular header as provided by an API, which can be received by the workspace management component 116(B). Requests with said header can be authenticated regardless of which domain the requests are sent or received from.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method, implemented at least in part by a client of a user of a group-based communication platform, comprising: presenting a user interface associated with the group-based communication platform, wherein an instance of a first workspace of the group-based communication platform that is associated with a first domain is presented via the user interface; receiving, via the user interface, a request to access a second workspace of the group-based communication platform that is associated with a second domain that is different from the first domain; based at least in part on a determination that the request is associated with an attribute that satisfies at least one criteria, sending the request to one or more computing devices associated with the second workspace; and based at least in part on sending the request to the one or more computing devices associated with the second workspace, receiving an instruction to cause an instance of the second workspace to be presented via the user interface.

B. The method of paragraph A, wherein the first domain and the second domain are at least one of physically or logically separated.

C. The method of paragraph A or B, wherein the first domain is associated with more restrictive data security than the second domain.

D. The method of any of paragraphs A-C, wherein the at least one criteria comprises an association with a domain that is on a list of domains treated as first-party with respect to the second domain.

E. The method of any of paragraphs A-D, wherein the attribute is a cookie corresponding to the first domain, and wherein the first domain is designated as a first-party with respect to the second domain, and wherein based at least in part on the first domain being designated as a first-party with respect to the second domain, associating another cookie with the request to indicate that the request is associated with the second domain.

F. The method of any of paragraphs A-E, wherein prior to causing the instance of the second workspace to be presented via the user interface, presenting an authentication request for a user to provide a credential associated with the second domain to authenticate the user with the second domain.

G. The method of any of paragraphs A-F, wherein the user interface comprises a first user interface element representative of the first workspace and a second user interface element representative of the second workspace, and wherein the request is received in response to an interaction with the second user interface element.

H. The method of any of paragraphs A-G, wherein the first workspace is associated with a first set of channels, direct messages, files, and user profiles and the second workspace is associated with a second set of channels, direct messages, files, and user profiles.

I. A method, implemented at least in part by a computing device of a group-based communication platform, comprising: causing a user interface associated with the group-based communication platform to be presented via a client, wherein an instance of a first workspace of the group-based communication platform is associated with a first domain is presented via the user interface; receiving, via the user interface, a request to access a second workspace of the group-based communication platform that is associated with a second domain that is different from the first domain; and causing, based at least in part on a determination that the request is associated with an attribute that satisfies at least one criteria, an instance of the second workspace to be presented via the user interface.

J. The method of paragraph I, wherein the first domain and the second domain are at least one of physically or logically separated.

K. The method of paragraph I or J, wherein the first domain is associated with more restrictive data security than the second domain.

L. The method of any of paragraphs I-K, wherein the at least one criteria comprises association with a domain that is on a list of domains are to be treated as first-party with respect to the second domain.

M. The method of any of paragraphs I-L, wherein the request is associated with a cookie corresponding to the second domain, and wherein the cookie is associated with request based at least in part on a determination that the first domain is on a list of domains.

N. The method of any of paragraphs I-M, wherein prior to causing the instance of the second workspace to be presented via the user interface, causing an authentication request to be presented via the user interface, wherein the authentication request prompts the user to provide a credential associated with the second domain to authenticate the user with the second domain.

O. The method of any of paragraphs I-N, wherein the user interface comprises a first user interface element representative of the first workspace and a second user interface element representative of the second workspace, and wherein the request is received in response to an interaction with the second user interface element.

P. The method of any of paragraphs I-O, wherein the first workspace is associated with a first set of channels, direct messages, files, and user profiles and the second workspace is associated with a second set of channels, direct messages, files, and user profiles.

Q. A system associated with a group-based communication platform comprising: one or more processors; and one or more non-transitory computer-readable media storing instructions that, when executed by the one or more processors, cause the system to perform operations comprising: causing a user interface associated with the group-based communication platform to be presented via a client, wherein an instance of a first workspace of the group-based communication platform that is associated with a first domain is presented via the user interface; receiving, via the user interface, a request to access a second workspace of the group-based communication platform that is associated with a second domain that is different from the first domain; and based at least in part on a determination that the request is associated with an attribute that satisfies at least one criteria, causing an instance of the second workspace to be presented via the user interface.

R. The system of paragraph Q, wherein the first domain and the second domain are at least one of physically or logically separated, and wherein the first domain is associated with more restrictive data security than the second domain.

S. The system of paragraph Q or R, wherein the at least one criteria comprises an association with a domain that is on a list of domains treated as first-party with respect to the second domain.

T. The system of any of paragraphs Q-S, wherein the attribute is a cookie corresponding to the first domain, and wherein the first domain is designated as a first-party with respect to the second domain, and wherein based at least in part on the first domain being designated as a first-party with respect to the second domain, associating another cookie with the request to indicate that the request is associated with the second domain.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method, implemented at least in part by one or more computing devices of a communication platform, the method comprising:
   causing to display, via a user interface associated with a group-based communication platform, a first instance of a first workspace associated with a first domain;
   receiving, via the user interface, a request to access a second workspace of the group-based communication platform that is associated with a second domain that is different from the first domain;

determining that the request is associated with a first cookie of the first domain;

causing, based at least in part on the request being associated with the first cookie, the request to be associated with a second cookie that is associated with the second domain;

sending, based at least in part on the request being associated with the second cookie, the request to one or more computing devices associated with the second workspace; and causing, based at least in part on sending the request to the one or more computing devices associated with the second workspace, a second instance of the second workspace to be presented via the user interface.

2. The method of claim 1, wherein causing the request to be associated with the second cookie is based at least in part on determining that the first cookie satisfies at least one criteria.

3. The method of claim 2, wherein the at least one criteria comprises an association with a domain that is included in a list of domains treated as first-party with respect to the second domain.

4. The method of claim 1, wherein the first workspace is associated with a first set of channels, direct messages, files, and user profiles and the second workspace is associated with a second set of channels, direct messages, files, and user profiles.

5. The method of claim 1, wherein the first domain and the second domain are at least one of physically or logically separated.

6. The method of claim 1, wherein prior to causing the second instance of the second workspace to be presented via the user interface, presenting an authentication request for a user to provide a credential associated with the second domain to authenticate the user with respect to the second domain.

7. The method of claim 1, wherein the user interface comprises a first user interface element representative of the first workspace and a second user interface element representative of the second workspace, and wherein the request is received in response to an interaction with the second user interface element.

8. The method of claim 1, further comprising:
determining that the first workspace is associated with a first set of users authorized to access the first workspace based at least in part on one or more first permissions associated with the first workspace; and
determining that the second workspace is associated with a second set of users that is different than the first set of users, wherein the second set of users is authorized to access the second workspace based at least in part on one or more second permissions associated with the second workspace that are different than the one or more first permissions.

9. A system comprising:
one or more processors; and
one or more non-transitory computer-readable media storing instructions that, when executed by the one or more processors, cause the system to perform operations comprising:
causing to display, via a user interface associated with a group-based communication platform, a first instance of a first workspace associated with a first domain;
receiving, via the user interface, a request to access a second workspace of the group-based communication platform that is associated with a second domain that is different from the first domain;
determining that the request is associated with a first cookie of the first domain;
causing, based at least in part on the request being associated with the first cookie, the request to be associated with a second cookie that is associated with the second domain;
sending, based at least in part on the request being associated with the second cookie, the request to one or more computing devices associated with the second workspace; and
causing, based at least in part on sending the request to the one or more computing devices associated with the second workspace, a second instance of the second workspace to be presented via the user interface.

10. The system of claim 9, wherein causing the request to be associated with the second cookie is based at least in part on determining that the first cookie satisfies at least one criteria.

11. The system of claim 10, wherein the at least one criteria comprises an association with a domain that is included in a list of domains treated as first-party with respect to the second domain.

12. The system of claim 9, wherein the first cookie corresponds to the first domain.

13. The system of claim 9, the operations further comprising:
determining that the first workspace is associated with a first set of users authorized to access the first workspace based at least in part on one or more first permissions associated with the first workspace; and
determining that the second workspace is associated with a second set of users that is different than the first set of users, wherein the second set of users is authorized to access the second workspace based at least in part on one or more second permissions associated with the second workspace that are different than the one or more first permissions.

14. The system of claim 9, wherein the first domain and the second domain are at least one of physically or logically separated.

15. One or more non-transitory computer-readable media storing instructions that, when executed, cause one or more processors to:
causing to display, via a user interface associated with a group-based communication platform, a first instance of a first workspace associated with a first domain;
receiving, via the user interface, a request to access a second workspace of the group-based communication platform that is associated with a second domain that is different from the first domain;
determining that the request is associated with a first cookie of the first domain;
causing, based at least in part on the request being associated with the first cookie, the request to be associated with a second cookie that is associated with the second domain;
sending, based at least in part on the request being associated with the second cookie, the request to one or more computing devices associated with the second workspace; and
causing, based at least in part on sending the request to the one or more computing devices associated with the second workspace, a second instance of the second workspace to be presented via the user interface.

16. The one or more non-transitory computer-readable media of claim 15, wherein causing the request to be associated with the second cookie is based at least in part on determining that the first cookie satisfies at least one criteria.

17. The one or more non-transitory computer-readable media of claim 16, wherein the at least one criteria comprises an association with a domain that is included in a list of domains treated as first-party with respect to the second domain.

18. The one or more non-transitory computer-readable media of claim 15, wherein the first cookie corresponds to the first domain.

19. The one or more non-transitory computer-readable media of claim 15, wherein the first domain and the second domain are at least one of physically or logically separated.

20. The one or more non-transitory computer-readable media of claim 15, further comprising:
- determining that the first workspace is associated with a first set of users authorized to access the first workspace based at least in part on one or more first permissions associated with the first workspace; and
- determining that the second workspace is associated with a second set of users that is different than the first set of users, wherein the second set of users is authorized to access the second workspace based at least in part on one or more second permissions associated with the second workspace that are different than the one or more first permissions.

* * * * *